United States Patent [19]

Kojima et al.

[11] Patent Number: 4,617,552
[45] Date of Patent: Oct. 14, 1986

[54] METHOD AND APPARATUS FOR CONVERTING A DIGITAL DATA

[75] Inventors: Yuichi Kojima; Shinichi Fukuda, both of Tokyo, Japan

[73] Assignee: Sony Corporation, Tokyo, Japan

[21] Appl. No.: 644,445

[22] Filed: Aug. 27, 1984

[30] Foreign Application Priority Data

Aug. 29, 1983 [JP] Japan ................................ 58-157643

[51] Int. Cl.⁴ ............................................. H03M 7/00
[52] U.S. Cl. ............................................. 340/347 DD
[58] Field of Search ............................... 340/347 DD

[56] References Cited

U.S. PATENT DOCUMENTS 4,520,346 5/1985 Shimada ...................... 340/347 DD

FOREIGN PATENT DOCUMENTS 0097763 1/1984 European Pat. Off. .
1150675 4/1969 United Kingdom .

*Primary Examiner*—Bernard Roskoski
*Attorney, Agent, or Firm*—Lewis H. Eslinger; Alvin Sinderbrand

[57] ABSTRACT

A method for converting a digital data into an NRZI-coded digital signal is disclosed which is carried out by the steps of first detecting if the value of every even numbered bit of the digital data is digital zero, second detecting if two bits of the detected even numbered bits having digital zero value and a preceding odd numbered bit have a DC component, producing a detecting signal according to the result of the second detecting; and converting the digital data into the NRZI-coded digital signal by using the detecting signal.

An apparatus for converting a digital data into an NRZI-coded digital signal is also disclosed which includes a first means for detecting if the value of every even numbered bit of the digital data is digital zero, a second means for detecting if two bits of the detected even numbered bits having digital zero value and a preceding odd numbered bit have a DC component, a means for producing a detecting signal according to the result of the second detecting, and a means for converting the digital data into the NRZI-coded digital signal by using the detecting signal.

8 Claims, 19 Drawing Figures

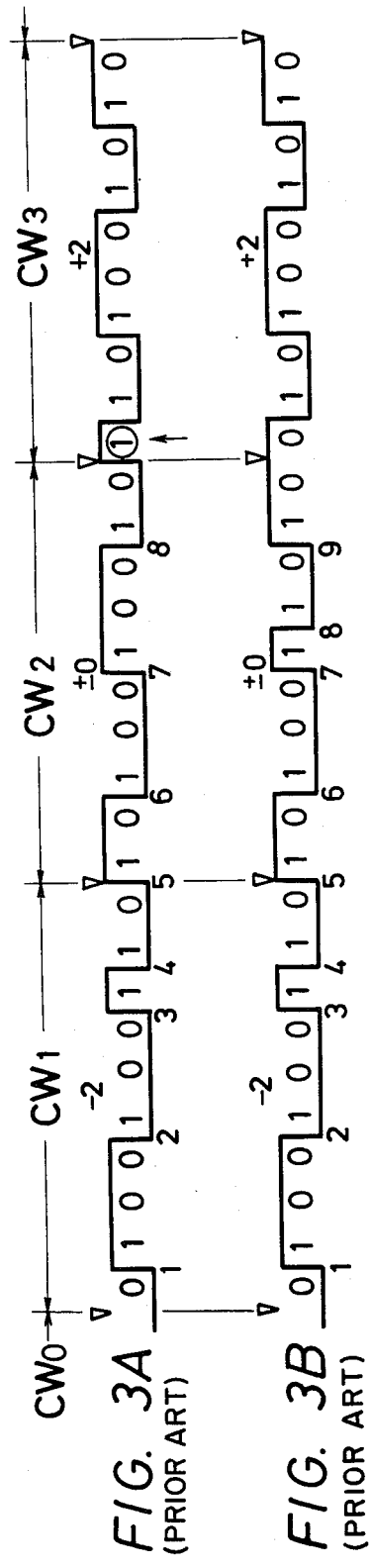

FIG. 12

PAGE

| | | Q' = 0 | | | | | Q' = 1 | | | | |
|---|---|---|---|---|---|---|---|---|---|---|---|
| DATA | CODE | DC | DSV | IDSV | P | Q | CODE | DC | DSV | IDSV | P | Q |
| 1 | 1100111110 | 0 | 3 | -19 | 1 | 1 | 1100111110 | 0 | 2 | 1 | 1 | 0 |
| 2 | 1100111011 | 0 | 3 | -17 | 1 | 1 | 1100111011 | 0 | 2 | 3 | 1 | 0 |
| 3 | 1100111001 | 0 | 3 | -15 | 0 | 0 | 1100111001 | 0 | 2 | 5 | 0 | 1 |
| 4 | 1100101010 | 0 | 3 | -17 | 1 | 1 | 1100101010 | 0 | 2 | 3 | 1 | 0 |
| 5 | 1100101111 | 0 | 3 | -15 | 1 | 1 | 1100101111 | 0 | 2 | 5 | 1 | 0 |
| 6 | 1100101101 | 0 | 3 | -13 | 0 | 0 | 1100101101 | 0 | 2 | 7 | 0 | 1 |
| 7 | 1100100101 | 0 | 3 | -13 | 1 | 1 | 1100100101 | 0 | 2 | 7 | 1 | 0 |
| 8 | 1100100111 | 0 | 3 | -11 | 0 | 0 | 1100100111 | 0 | 2 | 9 | 0 | 1 |
| 9 | 1101101110 | 0 | 3 | -17 | 1 | 1 | 1101101110 | 0 | 2 | 3 | 1 | 0 |
| 10 | 1101101011 | 0 | 3 | -15 | 1 | 1 | 1101101011 | 0 | 2 | 5 | 1 | 0 |
| 11 | 1101101001 | 0 | 3 | -13 | 0 | 0 | 1101101001 | 0 | 2 | 7 | 0 | 1 |
| 12 | 1101111010 | 0 | 3 | -15 | 1 | 1 | 1101111010 | 0 | 2 | 5 | 1 | 0 |
| 13 | 1101111111 | 0 | 2 | -13 | 1 | 1 | 1101111111 | 0 | 2 | 7 | 1 | 0 |
| 14 | 1101111101 | 0 | 2 | -11 | 0 | 0 | 1101111101 | 0 | 2 | 9 | 0 | 1 |
| 15 | 1101110101 | 0 | 2 | -11 | 1 | 1 | 1101110101 | 0 | 2 | 9 | 1 | 0 |
| 16 | 1101110111 | 0 | 2 | -9 | 0 | 0 | 1101110111 | 0 | 2 | 11 | 0 | 1 |
| 17 | 1101110010 | 0 | 2 | -7 | 0 | 0 | 1101110010 | 0 | 3 | 13 | 0 | 1 |
| 18 | 1101010010 | 0 | 3 | -13 | 1 | 1 | 1101010010 | 0 | 2 | 7 | 1 | 0 |
| 19 | 1101010111 | 0 | 2 | -11 | 1 | 1 | 1101010111 | 0 | 2 | 9 | 1 | 0 |
| 20 | 1101010101 | 0 | 2 | -9 | 0 | 0 | 1101010101 | 0 | 2 | 11 | 0 | 1 |
| 21 | 1101011101 | 0 | 2 | -9 | 1 | 1 | 1101011101 | 0 | 2 | 11 | 1 | 0 |
| 22 | 1101011111 | 0 | 2 | -7 | 0 | 0 | 1101011111 | 0 | 2 | 13 | 0 | 1 |
| 23 | 1101011010 | 0 | 2 | -5 | 0 | 0 | 1101011010 | 0 | 3 | 15 | 0 | 1 |
| 24 | 1101001001 | 0 | 2 | -7 | 1 | 1 | 1101001001 | 0 | 3 | 13 | 1 | 0 |
| 25 | 1101001011 | 0 | 2 | -5 | 0 | 0 | 1101001011 | 0 | 3 | 15 | 0 | 1 |
| 26 | 1101001110 | 0 | 2 | -3 | 0 | 0 | 1101001110 | 0 | 3 | 17 | 0 | 1 |
| 27 | 1111001110 | 0 | 3 | -15 | 1 | 1 | 1111001110 | 0 | 2 | 5 | 1 | 0 |
| 28 | 1111001011 | 0 | 3 | -13 | 1 | 1 | 1111001011 | 0 | 2 | 7 | 1 | 0 |
| 29 | 1111001001 | 0 | 3 | -11 | 0 | 0 | 1111001001 | 0 | 2 | 9 | 0 | 1 |
| 30 | 1111011010 | 0 | 3 | -13 | 1 | 1 | 1111011010 | 0 | 2 | 7 | 1 | 0 |
| 31 | 1111011111 | 0 | 2 | -11 | 1 | 1 | 1111011111 | 0 | 2 | 9 | 1 | 0 |
| 32 | 1111011101 | 0 | 2 | -9 | 0 | 0 | 1111011101 | 0 | 2 | 11 | 0 | 1 |
| 33 | 1111010101 | 0 | 2 | -9 | 1 | 1 | 1111010101 | 0 | 2 | 11 | 1 | 0 |
| 34 | 1111010111 | 0 | 2 | -7 | 0 | 0 | 1111010111 | 0 | 2 | 13 | 0 | 1 |
| 35 | 1111010010 | 0 | 2 | -5 | 0 | 0 | 1111010010 | 0 | 3 | 15 | 0 | 1 |
| 36 | 1111110010 | 0 | 3 | -11 | 1 | 1 | 1111110010 | 0 | 2 | 9 | 1 | 0 |
| 37 | 1111110111 | 0 | 2 | -9 | 1 | 1 | 1111110111 | 0 | 2 | 11 | 1 | 0 |
| 38 | 1111110101 | 0 | 2 | -7 | 0 | 0 | 1111110101 | 0 | 2 | 13 | 0 | 1 |
| 39 | 1111111101 | 0 | 2 | -7 | 1 | 1 | 1111111101 | 0 | 2 | 13 | 1 | 0 |
| 40 | 1111111111 | 0 | 1 | -5 | 0 | 0 | 1111111111 | 0 | 2 | 15 | 0 | 1 |
| 41 | 1111111010 | 0 | 1 | -3 | 0 | 0 | 1111111010 | 0 | 3 | 17 | 0 | 1 |
| 42 | 1111101001 | 0 | 2 | -5 | 1 | 1 | 1111101001 | 0 | 3 | 15 | 1 | 0 |
| 43 | 1111101011 | 0 | 1 | -3 | 0 | 0 | 1111101011 | 0 | 3 | 17 | 0 | 1 |
| 44 | 1111101110 | 0 | 1 | -1 | 0 | 0 | 1111101110 | 0 | 3 | 19 | 0 | 1 |
| 45 | 1110100111 | 0 | 2 | -7 | 1 | 1 | 1110100111 | 0 | 3 | 13 | 1 | 0 |
| 46 | 1110100101 | 0 | 2 | -5 | 0 | 0 | 1110100101 | 0 | 3 | 15 | 0 | 1 |
| 47 | 1110101101 | 0 | 2 | -5 | 1 | 1 | 1110101101 | 0 | 3 | 15 | 1 | 0 |
| 48 | 1110101111 | 0 | 1 | -3 | 0 | 0 | 1110101111 | 0 | 3 | 17 | 0 | 1 |
| 49 | 1110101010 | 0 | 1 | -1 | 0 | 0 | 1110101010 | 0 | 3 | 19 | 0 | 1 |
| 50 | 1110111001 | 0 | 2 | -3 | 1 | 1 | 1110111001 | 0 | 3 | 17 | 1 | 0 |
| 51 | 1110111011 | 0 | 1 | -1 | 0 | 0 | 1110111011 | 0 | 3 | 19 | 0 | 1 |
| 52 | 1110111110 | 0 | 1 | 1 | 0 | 0 | 1110111110 | 0 | 3 | 21 | 0 | 1 |

FIG. 13

| | Q' = 0 | | | | | | Q' = 1 | | | | | PAGE |
|---|---|---|---|---|---|---|---|---|---|---|---|---|
| DATA | CODE | DC | DSV | IDSV | P | Q | CODE | DC | DSV | IDSV | P | Q |
| 1 | 0100111110 | 0 | 2 | -1 | 0 | 0 | 0100111110 | 0 | 3 | 19 | 0 | 1 |
| 2 | 0100111011 | 0 | 2 | -3 | 0 | 0 | 0100111011 | 0 | 3 | 17 | 0 | 1 |
| 3 | 0100111001 | 0 | 2 | -5 | 1 | 1 | 0100111001 | 0 | 3 | 15 | 1 | 0 |
| 4 | 0100101010 | 0 | 2 | -3 | 0 | 0 | 0100101010 | 0 | 3 | 17 | 0 | 1 |
| 5 | 0100101111 | 0 | 2 | -5 | 0 | 0 | 0100101111 | 0 | 3 | 15 | 0 | 1 |
| 6 | 0100101101 | 0 | 2 | -7 | 1 | 1 | 0100101101 | 0 | 3 | 13 | 1 | 0 |
| 7 | 0100100101 | 0 | 2 | -7 | 0 | 0 | 0100100101 | 0 | 3 | 13 | 0 | 1 |
| 8 | 0100100111 | 0 | 2 | -9 | 1 | 1 | 0100100111 | 0 | 3 | 11 | 1 | 0 |
| 9 | 0101101110 | 0 | 2 | -3 | 0 | 0 | 0101101110 | 0 | 3 | 17 | 0 | 1 |
| 10 | 0101101011 | 0 | 2 | -5 | 0 | 0 | 0101101011 | 0 | 3 | 15 | 0 | 1 |
| 11 | 0101101001 | 0 | 2 | -7 | 1 | 1 | 0101101001 | 0 | 3 | 13 | 1 | 0 |
| 12 | 0101111010 | 0 | 2 | -5 | 0 | 0 | 0101111010 | 0 | 3 | 15 | 0 | 1 |
| 13 | 0101111111 | 0 | 2 | -7 | 0 | 0 | 0101111111 | 0 | 2 | 13 | 0 | 1 |
| 14 | 0101111101 | 0 | 2 | -9 | 1 | 1 | 0101111101 | 0 | 2 | 11 | 1 | 0 |
| 15 | 0101110101 | 0 | 2 | -9 | 0 | 0 | 0101110101 | 0 | 2 | 11 | 0 | 1 |
| 16 | 0101110111 | 0 | 2 | -11 | 1 | 1 | 0101110111 | 0 | 2 | 9 | 1 | 0 |
| 17 | 0101110010 | 0 | 3 | -13 | 1 | 1 | 0101110010 | 0 | 2 | 7 | 1 | 0 |
| 18 | 0101010010 | 0 | 2 | -7 | 0 | 0 | 0101010010 | 0 | 3 | 13 | 0 | 1 |
| 19 | 0101010111 | 0 | 2 | -9 | 0 | 0 | 0101010111 | 0 | 2 | 11 | 0 | 1 |
| 20 | 0101010101 | 0 | 2 | -11 | 1 | 1 | 0101010101 | 0 | 2 | 9 | 1 | 0 |
| 21 | 0101011101 | 0 | 2 | -11 | 0 | 0 | 0101011101 | 0 | 2 | 9 | 0 | 1 |
| 22 | 0101011111 | 0 | 2 | -13 | 1 | 1 | 0101011111 | 0 | 2 | 7 | 1 | 0 |
| 23 | 0101011010 | 0 | 3 | -15 | 1 | 1 | 0101011010 | 0 | 2 | 5 | 1 | 0 |
| 24 | 0101001001 | 0 | 3 | -13 | 0 | 0 | 0101001001 | 0 | 2 | 7 | 0 | 1 |
| 25 | 0101001011 | 0 | 3 | -15 | 1 | 1 | 0101001011 | 0 | 2 | 5 | 1 | 0 |
| 26 | 0101001110 | 0 | 3 | -17 | 1 | 1 | 0101001110 | 0 | 2 | 3 | 1 | 0 |
| 27 | 0111001110 | 0 | 2 | -5 | 0 | 0 | 0111001110 | 0 | 3 | 15 | 0 | 1 |
| 28 | 0111001011 | 0 | 2 | -7 | 0 | 0 | 0111001011 | 0 | 3 | 13 | 0 | 1 |
| 29 | 0111001001 | 0 | 2 | -9 | 1 | 1 | 0111001001 | 0 | 3 | 11 | 1 | 0 |
| 30 | 0111011010 | 0 | 2 | -7 | 0 | 0 | 0111011010 | 0 | 3 | 13 | 0 | 1 |
| 31 | 0111011111 | 0 | 2 | -9 | 0 | 0 | 0111011111 | 0 | 2 | 11 | 0 | 1 |
| 32 | 0111011101 | 0 | 2 | -11 | 1 | 1 | 0111011101 | 0 | 2 | 9 | 1 | 0 |
| 33 | 0111010101 | 0 | 2 | -11 | 0 | 0 | 0111010101 | 0 | 2 | 9 | 0 | 1 |
| 34 | 0111010111 | 0 | 2 | -13 | 1 | 1 | 0111010111 | 0 | 2 | 7 | 1 | 0 |
| 35 | 0111010010 | 0 | 3 | -15 | 1 | 1 | 0111010010 | 0 | 2 | 5 | 1 | 0 |
| 36 | 0111110010 | 0 | 2 | -9 | 0 | 0 | 0111110010 | 0 | 3 | 11 | 0 | 1 |
| 37 | 0111110111 | 0 | 2 | -11 | 0 | 0 | 0111110111 | 0 | 2 | 9 | 0 | 1 |
| 38 | 0111110101 | 0 | 2 | -13 | 1 | 1 | 0111110101 | 0 | 2 | 7 | 1 | 0 |
| 39 | 0111111101 | 0 | 2 | -13 | 0 | 0 | 0111111101 | 0 | 2 | 7 | 0 | 1 |
| 40 | 0111111111 | 0 | 2 | -15 | 1 | 1 | 0111111111 | 0 | 1 | 5 | 1 | 0 |
| 41 | 0111111010 | 0 | 3 | -17 | 1 | 1 | 0111111010 | 0 | 1 | 3 | 1 | 0 |
| 42 | 0111101001 | 0 | 3 | -15 | 0 | 0 | 0111101001 | 0 | 2 | 5 | 0 | 1 |
| 43 | 0111101011 | 0 | 3 | -17 | 1 | 1 | 0111101011 | 0 | 1 | 3 | 1 | 0 |
| 44 | 0111101110 | 0 | 3 | -19 | 1 | 1 | 0111101110 | 0 | 1 | 1 | 1 | 0 |
| 45 | 0110100111 | 0 | 3 | -13 | 0 | 0 | 0110100111 | 0 | 2 | 7 | 0 | 1 |
| 46 | 0110100101 | 0 | 3 | -15 | 1 | 1 | 0110100101 | 0 | 2 | 5 | 1 | 0 |
| 47 | 0110101101 | 0 | 3 | -15 | 0 | 0 | 0110101101 | 0 | 2 | 5 | 0 | 1 |
| 48 | 0110101111 | 0 | 3 | -17 | 1 | 1 | 0110101111 | 0 | 1 | 3 | 1 | 0 |
| 49 | 0110101010 | 0 | 3 | -19 | 1 | 1 | 0110101010 | 0 | 1 | 1 | 1 | 0 |
| 50 | 0110111001 | 0 | 3 | -17 | 0 | 0 | 0110111001 | 0 | 2 | 3 | 0 | 1 |
| 51 | 0110111011 | 0 | 3 | -19 | 1 | 1 | 0110111011 | 0 | 1 | 1 | 1 | 0 |
| 52 | 0110111110 | 0 | 3 | -21 | 1 | 1 | 0110111110 | 0 | 1 | -1 | 1 | 0 |

FIG. 14

| DATA | Q'=0 CODE | DC | DSV | IDSV | P | Q | Q'=1 CODE | DC | DSV | IDSV | P | Q |
|---|---|---|---|---|---|---|---|---|---|---|---|---|
| 1 | 1010001110 | 0 | 3 | -13 | 1 | 1 | 1010001110 | 0 | 3 | 7 | 1 | 0 |
| 2 | 1010001011 | 0 | 3 | -11 | 1 | 1 | 1010001011 | 0 | 3 | 9 | 1 | 0 |
| 3 | 1010001001 | 0 | 3 | -9 | 0 | 0 | 1010001001 | 0 | 3 | 11 | 0 | 1 |
| 4 | 1010011010 | 0 | 3 | -11 | 1 | 1 | 1010011010 | 0 | 3 | 9 | 1 | 0 |
| 5 | 1010011111 | 0 | 2 | -9 | 1 | 1 | 1010011111 | 0 | 3 | 11 | 1 | 0 |
| 6 | 1010011101 | 0 | 2 | -7 | 0 | 0 | 1010011101 | 0 | 3 | 13 | 0 | 1 |
| 7 | 1010010101 | 0 | 2 | -7 | 1 | 1 | 1010010101 | 0 | 3 | 13 | 1 | 0 |
| 8 | 1010010111 | 0 | 2 | -5 | 0 | 0 | 1010010111 | 0 | 3 | 15 | 0 | 1 |
| 9 | 1010010010 | 0 | 2 | -3 | 0 | 0 | 1010010010 | 0 | 3 | 17 | 0 | 1 |
| 10 | 1010110010 | 0 | 3 | -9 | 1 | 1 | 1010110010 | 0 | 3 | 11 | 1 | 0 |
| 11 | 1010110111 | 0 | 2 | -7 | 1 | 1 | 1010110111 | 0 | 3 | 13 | 1 | 0 |
| 12 | 1010110101 | 0 | 2 | -5 | 0 | 0 | 1010110101 | 0 | 3 | 15 | 0 | 1 |
| 13 | 1010111101 | 0 | 2 | -5 | 1 | 1 | 1010111101 | 0 | 3 | 15 | 1 | 0 |
| 14 | 1010111111 | 0 | 1 | -3 | 0 | 0 | 1010111111 | 0 | 3 | 17 | 0 | 1 |
| 15 | 1010111010 | 0 | 1 | -1 | 0 | 0 | 1010111010 | 0 | 3 | 19 | 0 | 1 |
| 16 | 1010101001 | 0 | 2 | -3 | 1 | 1 | 1010101001 | 0 | 3 | 17 | 1 | 0 |
| 17 | 1010101011 | 0 | 1 | -1 | 0 | 0 | 1010101011 | 0 | 3 | 19 | 0 | 1 |
| 18 | 1010101110 | 0 | 1 | 1 | 0 | 0 | 1010101110 | 0 | 3 | 21 | 0 | 1 |
| 19 | 1011100111 | 0 | 2 | -5 | 1 | 1 | 1011100111 | 0 | 3 | 15 | 1 | 0 |
| 20 | 1011100101 | 0 | 2 | -3 | 0 | 0 | 1011100101 | 0 | 3 | 17 | 0 | 1 |
| 21 | 1011101101 | 0 | 2 | -3 | 1 | 1 | 1011101101 | 0 | 3 | 17 | 1 | 0 |
| 22 | 1011101111 | 0 | 1 | -1 | 0 | 0 | 1011101111 | 0 | 3 | 19 | 0 | 1 |
| 23 | 1011101010 | 0 | 1 | 1 | 0 | 0 | 1011101010 | 0 | 3 | 21 | 0 | 1 |
| 24 | 1011111001 | 0 | 2 | -1 | 1 | 1 | 1011111001 | 0 | 3 | 19 | 1 | 0 |
| 25 | 1011111011 | 0 | 1 | 1 | 0 | 0 | 1011111011 | 0 | 3 | 21 | 0 | 1 |
| 26 | 1011111110 | 0 | 1 | 3 | 0 | 0 | 1011111110 | 0 | 3 | 23 | 0 | 1 |
| 27 | 0100011010 | 0 | 3 | -9 | 0 | 0 | 0100011010 | 0 | 3 | 11 | 0 | 1 |
| 28 | 0100011111 | 0 | 3 | -11 | 0 | 0 | 0100011111 | 0 | 2 | 9 | 0 | 1 |
| 29 | 0100011101 | 0 | 3 | -13 | 1 | 1 | 0100011101 | 0 | 2 | 7 | 1 | 0 |
| 30 | 0100010101 | 0 | 3 | -13 | 0 | 0 | 0100010101 | 0 | 2 | 7 | 0 | 1 |
| 31 | 0100010111 | 0 | 3 | -15 | 1 | 1 | 0100010111 | 0 | 2 | 5 | 1 | 0 |
| 32 | 0100010010 | 0 | 3 | -17 | 1 | 1 | 0100010010 | 0 | 2 | 3 | 1 | 0 |
| 33 | 0100110010 | 0 | 3 | -11 | 0 | 0 | 0100110010 | 0 | 3 | 9 | 0 | 1 |
| 34 | 0100110111 | 0 | 3 | -13 | 0 | 0 | 0100110111 | 0 | 2 | 7 | 0 | 1 |
| 35 | 0100110101 | 0 | 3 | -15 | 1 | 1 | 0100110101 | 0 | 2 | 5 | 1 | 0 |
| 36 | 0100111101 | 0 | 3 | -15 | 0 | 0 | 0100111101 | 0 | 2 | 5 | 0 | 1 |
| 37 | 0100111111 | 0 | 3 | -17 | 1 | 1 | 0100111111 | 0 | 1 | 3 | 1 | 0 |
| 38 | 0100111010 | 0 | 3 | -19 | 1 | 1 | 0100111010 | 0 | 1 | 1 | 1 | 0 |
| 39 | 0100101001 | 0 | 3 | -17 | 0 | 0 | 0100101001 | 0 | 2 | 3 | 0 | 1 |
| 40 | 0100101011 | 0 | 3 | -19 | 1 | 1 | 0100101011 | 0 | 1 | 1 | 1 | 0 |
| 41 | 0100101110 | 0 | 3 | -21 | 1 | 1 | 0100101110 | 0 | 1 | -1 | 1 | 0 |
| 42 | 0011100111 | 0 | 3 | -15 | 0 | 0 | 0011100111 | 0 | 2 | 5 | 0 | 1 |
| 43 | 0011100101 | 0 | 3 | -17 | 1 | 1 | 0011100101 | 0 | 2 | 3 | 1 | 0 |
| 44 | 0011101101 | 0 | 3 | -17 | 0 | 0 | 0011101101 | 0 | 2 | 3 | 0 | 1 |
| 45 | 0011101111 | 0 | 3 | -19 | 1 | 1 | 0011101111 | 0 | 1 | 1 | 1 | 0 |
| 46 | 0011101010 | 0 | 3 | -21 | 1 | 1 | 0011101010 | 0 | 1 | -1 | 1 | 0 |
| 47 | 0011111001 | 0 | 3 | -19 | 0 | 0 | 0011111001 | 0 | 2 | 1 | 0 | 1 |
| 48 | 0011111011 | 0 | 3 | -21 | 1 | 1 | 0011111011 | 0 | 1 | -1 | 1 | 0 |
| 49 | 0011111110 | 0 | 3 | -23 | 1 | 1 | 0011111110 | 0 | 1 | -3 | 1 | 0 |

FIG. 15

|  | Q' = 0 | | | | | | Q' = 1 | | | | | PAGE |
| DATA | CODE | DC | DSV | IDSV | P | Q | CODE | DC | DSV | IDSV | P | Q |
| --- | --- | --- | --- | --- | --- | --- | --- | --- | --- | --- | --- | --- |
| 1 | 1100100110 | 2 | 3 | -10 | 1 | 0 | 0100100110 | -2 | 3 | 10 | 0 | 0 |
| 2 | 1100100011 | 2 | 3 | -8 | 1 | 0 | 0100100011 | -2 | 3 | 8 | 0 | 0 |
| 3 | 1101110110 | 2 | 2 | -8 | 1 | 0 | 0101110110 | -2 | 2 | 8 | 0 | 0 |
| 4 | 1101110011 | 2 | 2 | -6 | 1 | 0 | 0101110011 | -2 | 2 | 6 | 0 | 0 |
| 5 | 1101110001 | 2 | 2 | -4 | 0 | 1 | 0101110001 | -2 | 2 | 4 | 1 | 1 |
| 6 | 1101011110 | 2 | 2 | -6 | 1 | 0 | 0101011110 | -2 | 2 | 6 | 0 | 0 |
| 7 | 1101011011 | 2 | 2 | -4 | 1 | 0 | 0101011011 | -2 | 2 | 4 | 0 | 0 |
| 8 | 1101011001 | 2 | 2 | -2 | 0 | 1 | 0101011001 | -2 | 2 | 2 | 1 | 1 |
| 9 | 1101001010 | 2 | 2 | -4 | 1 | 0 | 0101001010 | -2 | 2 | 4 | 0 | 0 |
| 10 | 1101001111 | 2 | 2 | -2 | 1 | 0 | 0101001111 | -2 | 2 | 2 | 0 | 0 |
| 11 | 1101001101 | 2 | 2 | 0 | 0 | 1 | 0101001101 | -2 | 2 | 0 | 1 | 1 |
| 12 | 1101000101 | 2 | 2 | 0 | 1 | 0 | 0101000101 | -2 | 2 | 0 | 0 | 0 |
| 13 | 1101000111 | 2 | 2 | 2 | 0 | 1 | 0101000111 | -2 | 2 | -2 | 1 | 1 |
| 14 | 1111010110 | 2 | 2 | -6 | 1 | 0 | 0111010110 | -2 | 2 | 6 | 0 | 0 |
| 15 | 1111010011 | 2 | 2 | -4 | 1 | 0 | 0111010011 | -2 | 2 | 4 | 0 | 0 |
| 16 | 1111010001 | 2 | 2 | -2 | 0 | 1 | 0111010001 | -2 | 2 | 2 | 1 | 1 |
| 17 | 1111111110 | 2 | 1 | -4 | 1 | 0 | 0111111110 | -2 | 1 | 4 | 0 | 0 |
| 18 | 1111111011 | 2 | 1 | -2 | 1 | 0 | 0111111011 | -2 | 1 | 2 | 0 | 0 |
| 19 | 1111111001 | 2 | 2 | 0 | 0 | 1 | 0111111001 | -2 | 2 | 0 | 1 | 1 |
| 20 | 1111101010 | 2 | 1 | -2 | 1 | 0 | 0111101010 | -2 | 1 | 2 | 0 | 0 |
| 21 | 1111101111 | 2 | 1 | 0 | 1 | 0 | 0111101111 | -2 | 1 | 0 | 0 | 0 |
| 22 | 1111101101 | 2 | 2 | 2 | 0 | 1 | 0111101101 | -2 | 2 | -2 | 1 | 1 |
| 23 | 1111100101 | 2 | 2 | 2 | 1 | 0 | 0111100101 | -2 | 2 | -2 | 0 | 0 |
| 24 | 1111100111 | 2 | 2 | 4 | 0 | 1 | 0111100111 | -2 | 2 | -4 | 1 | 1 |
| 25 | 1110101110 | 2 | 1 | -2 | 1 | 0 | 0110101110 | -2 | 1 | 2 | 0 | 0 |
| 26 | 1110101011 | 2 | 1 | 0 | 1 | 0 | 0110101011 | -2 | 1 | 0 | 0 | 0 |
| 27 | 1110101001 | 2 | 2 | 2 | 0 | 1 | 0110101001 | -2 | 2 | -2 | 1 | 1 |
| 28 | 1110111010 | 2 | 1 | 0 | 1 | 0 | 0110111010 | -2 | 1 | 0 | 0 | 0 |
| 29 | 1110111111 | 2 | 1 | 2 | 1 | 0 | 0110111111 | -2 | 1 | -2 | 0 | 0 |
| 30 | 1110111101 | 2 | 2 | 4 | 0 | 1 | 0110111101 | -2 | 2 | -4 | 1 | 1 |
| 31 | 1110110101 | 2 | 2 | 4 | 1 | 0 | 0110110101 | -2 | 2 | -4 | 0 | 0 |
| 32 | 1110110111 | 2 | 2 | 6 | 0 | 1 | 0110110111 | -2 | 2 | -6 | 1 | 1 |
| 33 | 1110110010 | 2 | 3 | 8 | 0 | 1 | 0110110010 | -2 | 3 | -8 | 1 | 1 |
| 34 | 1110010010 | 2 | 2 | 2 | 1 | 0 | 0110010010 | -2 | 2 | -2 | 0 | 0 |
| 35 | 1110010111 | 2 | 2 | 4 | 1 | 0 | 0110010111 | -2 | 2 | -4 | 0 | 0 |
| 36 | 1110010101 | 2 | 2 | 6 | 0 | 1 | 0110010101 | -2 | 2 | -6 | 1 | 1 |
| 37 | 1110011101 | 2 | 2 | 6 | 1 | 0 | 0110011101 | -2 | 2 | -6 | 0 | 0 |
| 38 | 1110011111 | 2 | 2 | 8 | 0 | 1 | 0110011111 | -2 | 2 | -8 | 1 | 1 |
| 39 | 1110011010 | 2 | 3 | 10 | 0 | 1 | 0110011010 | -2 | 3 | -10 | 1 | 1 |
| 40 | 1110001001 | 2 | 3 | 8 | 1 | 0 | 0110001001 | -2 | 3 | -8 | 0 | 0 |
| 41 | 1110001011 | 2 | 3 | 10 | 0 | 1 | 0110001011 | -2 | 3 | -10 | 1 | 1 |
| 42 | 1110001110 | 2 | 3 | 12 | 0 | 1 | 0110001110 | -2 | 3 | -12 | 1 | 1 |

FIG. 16

|  | Q' = 0 | | | | | | Q' = 1 | | | | | PAGE |
| DATA | CODE | DC | DSV | IDSV | P | Q | CODE | DC | DSV | IDSV | P | Q |
| 1 | 0100011010 | 2 | 3 | 8 | 0 | 1 | 1100011010 | -2 | 3 | -8 | 1 | 1 |
| 2 | 0100011111 | 2 | 2 | 6 | 0 | 1 | 1100011111 | -2 | 2 | -6 | 1 | 1 |
| 3 | 0100011101 | 2 | 2 | 4 | 1 | 0 | 1100011101 | -2 | 2 | -4 | 0 | 0 |
| 4 | 0100010101 | 2 | 2 | 4 | 0 | 1 | 1100010101 | -2 | 2 | -4 | 1 | 1 |
| 5 | 0100010111 | 2 | 2 | 2 | 1 | 0 | 1100010111 | -2 | 2 | -2 | 0 | 0 |
| 6 | 0100010010 | 2 | 2 | 0 | 1 | 0 | 1100010010 | -2 | 2 | 0 | 0 | 0 |
| 7 | 0100110010 | 2 | 3 | 6 | 0 | 1 | 1100110010 | -2 | 3 | -6 | 1 | 1 |
| 8 | 0100110111 | 2 | 2 | 4 | 0 | 1 | 1100110111 | -2 | 2 | -4 | 1 | 1 |
| 9 | 0100110101 | 2 | 2 | 2 | 1 | 0 | 1100110101 | -2 | 2 | -2 | 0 | 0 |
| 10 | 0100111101 | 2 | 2 | 2 | 0 | 1 | 1100111101 | -2 | 2 | -2 | 1 | 1 |
| 11 | 0100111111 | 2 | 2 | 0 | 1 | 0 | 1100111111 | -2 | 2 | 0 | 0 | 0 |
| 12 | 0100111010 | 2 | 2 | -2 | 1 | 0 | 1100111010 | -2 | 2 | 2 | 0 | 0 |
| 13 | 0100101001 | 2 | 2 | 0 | 0 | 1 | 1100101001 | -2 | 2 | 0 | 1 | 1 |
| 14 | 0100101011 | 2 | 2 | -2 | 1 | 0 | 1100101011 | -2 | 2 | 2 | 0 | 0 |
| 15 | 0100101110 | 2 | 2 | -4 | 1 | 0 | 1100101110 | -2 | 2 | 4 | 0 | 0 |
| 16 | 0101100111 | 2 | 2 | 2 | 0 | 1 | 1101100111 | -2 | 2 | -2 | 1 | 1 |
| 17 | 0101100101 | 2 | 2 | 0 | 1 | 0 | 1101100101 | -2 | 2 | 0 | 0 | 0 |
| 18 | 0101101101 | 2 | 2 | 0 | 0 | 1 | 1101101101 | -2 | 2 | 0 | 1 | 1 |
| 19 | 0101101111 | 2 | 2 | -2 | 1 | 0 | 1101101111 | -2 | 2 | 2 | 0 | 0 |
| 20 | 0101101010 | 2 | 2 | -4 | 1 | 0 | 1101101010 | -2 | 2 | 4 | 0 | 0 |
| 21 | 0101111001 | 2 | 2 | -2 | 0 | 1 | 1101111001 | -2 | 2 | 2 | 1 | 1 |
| 22 | 0101111011 | 2 | 2 | -4 | 1 | 0 | 1101111011 | -2 | 2 | 4 | 0 | 0 |
| 23 | 0101111110 | 2 | 2 | -6 | 1 | 0 | 1101111110 | -2 | 2 | 6 | 0 | 0 |
| 24 | 0101010001 | 2 | 2 | -4 | 0 | 1 | 1101010001 | -2 | 2 | 4 | 1 | 1 |
| 25 | 0101010011 | 2 | 2 | -6 | 1 | 0 | 1101010011 | -2 | 2 | 6 | 0 | 0 |
| 26 | 0101010110 | 2 | 2 | -8 | 1 | 0 | 1101010110 | -2 | 2 | 8 | 0 | 0 |
| 27 | 0111000111 | 2 | 2 | 0 | 0 | 1 | 1111000111 | -2 | 2 | 0 | 1 | 1 |
| 28 | 0111000101 | 2 | 2 | -2 | 1 | 0 | 1111000101 | -2 | 2 | 2 | 0 | 0 |
| 29 | 0111001101 | 2 | 2 | -2 | 0 | 1 | 1111001101 | -2 | 2 | 2 | 1 | 1 |
| 30 | 0111001111 | 2 | 2 | -4 | 1 | 0 | 1111001111 | -2 | 2 | 4 | 0 | 0 |
| 31 | 0111001010 | 2 | 2 | -6 | 1 | 0 | 1111001010 | -2 | 2 | 6 | 0 | 0 |
| 32 | 0111011001 | 2 | 2 | -4 | 0 | 1 | 1111011001 | -2 | 2 | 4 | 1 | 1 |
| 33 | 0111011011 | 2 | 2 | -6 | 1 | 0 | 1111011011 | -2 | 2 | 6 | 0 | 0 |
| 34 | 0111011110 | 2 | 2 | -8 | 1 | 0 | 1111011110 | -2 | 2 | 8 | 0 | 0 |
| 35 | 0111110001 | 2 | 2 | -6 | 0 | 1 | 1111110001 | -2 | 2 | 6 | 1 | 1 |
| 36 | 0111110011 | 2 | 2 | -8 | 1 | 0 | 1111110011 | -2 | 2 | 8 | 0 | 0 |
| 37 | 0111110110 | 2 | 2 | -10 | 1 | 0 | 1111110110 | -2 | 2 | 10 | 0 | 0 |
| 38 | 0110100011 | 2 | 3 | -10 | 1 | 0 | 1110100011 | -2 | 3 | 10 | 0 | 0 |
| 39 | 0110100110 | 2 | 3 | -12 | 1 | 0 | 1110100110 | -2 | 3 | 12 | 0 | 0 |

FIG. 17

|  | Q' = 0 | | | | | | Q' = 1 | | | | | PAGE |
| DATA | CODE | DC | DSV | IDSV | P | Q | CODE | DC | DSV | IDSV | P | Q |
| --- | --- | --- | --- | --- | --- | --- | --- | --- | --- | --- | --- | --- |
| 1 | 1010010110 | 2 | 2 | -4 | 1 | 0 | 0010010110 | -2 | 2 | 4 | 0 | 0 |
| 2 | 1010010011 | 2 | 2 | -2 | 1 | 0 | 0010010011 | -2 | 2 | 2 | 0 | 0 |
| 3 | 1010010001 | 2 | 2 | 0 | 0 | 1 | 0010010001 | -2 | 2 | 0 | 1 | 1 |
| 4 | 1010111110 | 2 | 1 | -2 | 1 | 0 | 0010111110 | -2 | 1 | 2 | 0 | 0 |
| 5 | 1010111011 | 2 | 1 | 0 | 1 | 0 | 0010111011 | -2 | 1 | 0 | 0 | 0 |
| 6 | 1010111001 | 2 | 2 | 2 | 0 | 1 | 0010111001 | -2 | 2 | -2 | 1 | 1 |
| 7 | 1010101010 | 2 | 1 | 0 | 1 | 0 | 0010101010 | -2 | 1 | 0 | 0 | 0 |
| 8 | 1010101111 | 2 | 1 | 2 | 1 | 0 | 0010101111 | -2 | 1 | -2 | 0 | 0 |
| 9 | 1010101101 | 2 | 2 | 4 | 0 | 1 | 0010101101 | -2 | 2 | -4 | 1 | 1 |
| 10 | 1010100101 | 2 | 2 | 4 | 1 | 0 | 0010100101 | -2 | 2 | -4 | 0 | 0 |
| 11 | 1010100111 | 2 | 2 | 6 | 0 | 1 | 0010100111 | -2 | 2 | -6 | 1 | 1 |
| 12 | 1011101110 | 2 | 1 | 0 | 1 | 0 | 0011101110 | -2 | 1 | 0 | 0 | 0 |
| 13 | 1011101011 | 2 | 1 | 2 | 1 | 0 | 0011101011 | -2 | 1 | -2 | 0 | 0 |
| 14 | 1011101001 | 2 | 2 | 4 | 0 | 1 | 0011101001 | -2 | 2 | -4 | 1 | 1 |
| 15 | 1011111010 | 2 | 1 | 2 | 1 | 0 | 0011111010 | -2 | 1 | -2 | 0 | 0 |
| 16 | 1011111111 | 2 | 1 | 4 | 1 | 0 | 0011111111 | -2 | 1 | -4 | 0 | 0 |
| 17 | 1011111101 | 2 | 2 | 6 | 0 | 1 | 0011111101 | -2 | 2 | -6 | 1 | 1 |
| 18 | 1011110101 | 2 | 2 | 6 | 1 | 0 | 0011110101 | -2 | 2 | -6 | 0 | 0 |
| 19 | 1011110111 | 2 | 2 | 8 | 0 | 1 | 0011110111 | -2 | 2 | -8 | 1 | 1 |
| 20 | 1011110010 | 2 | 3 | 10 | 0 | 1 | 0011110010 | -2 | 3 | -10 | 1 | 1 |
| 21 | 1011010010 | 2 | 2 | 4 | 1 | 0 | 0011010010 | -2 | 2 | -4 | 0 | 0 |
| 22 | 1011010111 | 2 | 2 | 6 | 1 | 0 | 0011010111 | -2 | 2 | -6 | 0 | 0 |
| 23 | 1011010101 | 2 | 2 | 8 | 0 | 1 | 0011010101 | -2 | 2 | -8 | 1 | 1 |
| 24 | 1011011101 | 2 | 2 | 8 | 1 | 0 | 0011011101 | -2 | 2 | -8 | 0 | 0 |
| 25 | 1011011111 | 2 | 2 | 10 | 0 | 1 | 0011011111 | -2 | 2 | -10 | 1 | 1 |
| 26 | 1011011010 | 2 | 3 | 12 | 0 | 1 | 0011011010 | -2 | 3 | -12 | 1 | 1 |
| 27 | 1011001001 | 2 | 3 | 10 | 1 | 0 | 0011001001 | -2 | 3 | -10 | 0 | 0 |
| 28 | 1011001011 | 2 | 3 | 12 | 0 | 1 | 0011001011 | -2 | 3 | -12 | 1 | 1 |
| 29 | 1011001110 | 2 | 3 | 14 | 0 | 1 | 0011001110 | -2 | 3 | -14 | 1 | 1 |
| 30 | 0010011001 | 2 | 3 | -6 | 0 | 1 | 1010011001 | -2 | 3 | 6 | 1 | 1 |
| 31 | 0010011011 | 2 | 3 | -8 | 1 | 0 | 1010011011 | -2 | 3 | 8 | 0 | 0 |
| 32 | 0010011110 | 2 | 3 | -10 | 1 | 0 | 1010011110 | -2 | 3 | 10 | 0 | 0 |
| 33 | 0010110001 | 2 | 3 | -8 | 0 | 1 | 1010110001 | -2 | 3 | 8 | 1 | 1 |
| 34 | 0010110011 | 2 | 3 | -10 | 1 | 0 | 1010110011 | -2 | 3 | 10 | 0 | 0 |
| 35 | 0010110110 | 2 | 3 | -12 | 1 | 0 | 1010110110 | -2 | 3 | 12 | 0 | 0 |
| 36 | 0011100011 | 2 | 3 | -12 | 1 | 0 | 1011100011 | -2 | 3 | 12 | 0 | 0 |
| 37 | 0011100110 | 2 | 3 | -14 | 1 | 0 | 1011100110 | -2 | 3 | 14 | 0 | 0 |

METHOD AND APPARATUS FOR CONVERTING A DIGITAL DATA

BACKGROUND OF THE INVENTION

1. Field of the Invention

The present invention generally relates to a digital data converting method and the apparatus thereof and, more particularly, to a digital data converting method and apparatus thereof suitable for use with a case in which an audio signal or the like is pulse code-modulated (PCM) and then recorded.

2. Description of the Prior Art

If an analog signal such as an audio signal is converted to digital form prior to recording, the fidelity of the recorded signal thereof can be greatly enhanced. A common recording scheme converts an original analog signal into digital data using the pulse code modulation (PCM). The PCM digital data is then modulated using a so-called NRZI (non-return to zero, inverted) coding system. The NRZI coding system enables recording at the same bit densities possible with NRZ coding but without the problems associated with a signal polarity in the NRZ coding.

In the NRZI coding system, a "1" digital bit is represented by a transition between the two levels of a bi-level signal, while a continuation of the bi-level signal at the same level represents a "0" digital bit. In NRZI code, then, the actual level of the signal, whether high or low, does not represent digital information. Instead, the digital information is determined by whether or not the signal has changed levels between adjacent bit cells. For example, if the portion of the signal representing a particular bit of digital data is at the same level as the portion representing the preceding bit, then that particular bit is a digital zero.

The present applicant has previously proposed such information converting system as follows. This system employs a 8/10 converting scheme in which each eight bits of digital information in a base digital is converted to a ten-bit word to form a converted digital signal. Eight bits ($B_1$, $B_2$, $B_3$, $B_4$, $B_5$, $B_6$, $B_7$, $B_8$) can be combined in 256 ($2^8$) different ways. With 10 bits, 1024 ($2^{10}$) combinations are possible. Thus, 256 of the 1024 possible ten-bit combinations are used to represent the eight-bit combinations.

In accordance with the conditions set forth above, there are certain constraints on which 256 combinations can be used. First, those conditions require that the DC component in the converted signal be zero. Second, because NRZI coding is being used, the number of consecutive digital zeroes in the converted signal must never exceed three, otherwise $T_{max}/T_{min}$ (where $T_{max}$ is the maximum interval between level transitions and $T_{min}$ is minimum interval between transitions) will be greater than four.

With those constraints, the following table I shows the possible combinations of ten digital bits in NRZI code for which the DC component is zero, but in which there are no more than three digital zeroes in a row (either internally of each ten-bit word or at the juncture between two such words):

TABLE I

|  | ...1 | ...10 | ...100 | ...1000 |
|---|---|---|---|---|
| 1... | 69 | 34 | 14 | 4 |
| 01... | 40 | 20 | 8 | 1 |
| 001... | 20 | 10 | 3 | 1 |

TABLE I-continued

|  | ...1 | ...10 | ...100 | ...1000 |
|---|---|---|---|---|
| 0001... | 8 | 3 | 2 | 1 |

Table I shows that there are numerous possible combinations that will satisfy the constraints. For example, if up to three digital zeroes are permitted at the beginning of each word, then no digital zeroes can be permitted at the end of any word. In that case, Table I shows that the total of the possible combinations is:

$$137 = 69 + 40 + 20 + 8$$

From all of the possible combinations in Table I, the maximum total is achieved if no more than two digital zeroes are permitted at the beginning of a ten-bit converted word and no more than one digital zero is permitted at the end. In that case, the total is:

$$193 = 69 + 40 + 20 + 34 + 20 + 10$$

Thus, 193 ten-bit combinations are available for which the DC component is zero. These are called "primary combinations."

Since there are 256 possible eight-bit words of original data, 63 additional ten-bit combinations are required to represent all of the original data. Thus, it is necessary to use ten-bit combinations for which the DC component is not zero.

The following table illustrates the number of possible combinations of ten-bit combinations, which begin with no more than two digital zeroes and end with no more than one digital zero, having DC component with 0, −2 and +2 when NRZI-coded.

TABLE II

|  | −2 | 0 | +2 |
|---|---|---|---|
| 1... | 52 | 103 | 100 |
| 01... | 43 | 60 | 40 |
| 001... | 30 | 30 | 11 |

Table II shows the 193 (= 103 + 60 + 30) possible combinations in which the DC component is zero, as discussed in connection with Table II. Note that the entries in the "0" column of Table II: 103 (= 69 + 34); 60 (= 40 + 20); and 30 (= 20 + 10), represent the totals from the "...1" and "..01" columns of Table I.

To calculate the DC components for Table II it was assumed that the last bit of the next-preceding ten-bit combination was at the signal's low level. If Table II were constructed by assuming that the level of the last bit of the preceding word was high, then the "−2" and "+2" columns would be interchanged. In any case, the assumption regarding the beginning level of the converted words is merely a convention. The DC component obtained under that convention will be referred to as the "convention DC component". As will be clear below, it does not affect this case that the convention so established. That particular convention is adopted only for purposes of this description.

FIGS. 1A to 1C illustrate some examples of the converted words used to construct Table II. For example, FIGS. 1A and 1B show ten-bit combinations in NRZI code with a convention DC component of −2; FIG. 1C shows a ten-bit combination with a convention DC component of +2. FIGS. 1A to 1C also illustrate that if Table II were constructed defining the convention DC component by assuming the last bit of the next-preceding ten-bit combination was at the signal's higher level, the "−2" and "+2" columns would be reversed.

In any case, since only 193 primary ten-bit combinations, with a zero DC component, are available, 63 more "secondary combinations", those with a non-zero DC component are required to completely represent all of the 256 combinations possible with the original eight-bit data words. For reasons that are explained below, it is necessary in the above example that the initial bit of the ten-bit combination in NRZI code be a digital zero. In addition, in this embodiment the convention DC component of all of the secondary combinations is the same. That being the case, Table II shows that there are insufficient combinations (40+11) of bits having a convention DC component of +2. Thus, the required 63 additional combinations are chosen from the 73 (43+30) ten-bit combinations having a convention DC component of −2.

FIGS. 2A and 2B illustrate an important property of the ten-bit secondary combinations thus chosen. If the first bit in a secondary combination, as shown in FIG. 2B, is inverted, its convention DC component is changed from −2 to +2. It is possible to invert other bits within secondary combinations to change the DC component from −2 to +2, but it is preferred to change the convention DC component by inverting the first bit, since that always results in changing the DC component from −2 to +2 and changing the actual DC component from +2 or −2 to −2 or +2, respectively.

The method of this embodiment can be understood by reference to FIGS. 3A and 3B. Assume that, as shown in FIG. 3A, a particular portion of the converted digital signal ends at the lower signal level. Assume also that the DC component of the signal at the end of this signal portion is zero. In FIGS. 3A and 3B, the inverted delta indicates the beginning and end of consecutive converted words. If the first full converted word $CW_1$ in FIG. 3A comprises a secondary combination, then its DC component will be −2. For all of the following words that comprise primary combinations, the DC components are zero. Thus, the DC component in the entire signal remains at −2. When the next secondary ten-bit combination $CW_3$ is encountered, the DC component of the signal portion including the pair of secondary combinations can be returned to zero in accordance with this example by inverting a bit in the next secondary combination if its actual DC component is the same as the actual DC component of the first secondary combination in that signal portion.

Taking FIG. 3A as a first example, the number of level transitions in the signal portion including the pair of secondary combinations prior to the beginning of the second secondary combination is eight, which is an even number. The level of the signal at the beginning of the second secondary ten-bit combination will be the same after an even number of level changes as the signal level at the beginning of the first secondary combination. Thus, if the second secondary combination begins on the same level, its actual DC component will be the same, here a −2. But if the first bit of that second secondary combination is changed from a digital zero to a digital one, then the DC component of the second secondary combination becomes +2. When added to the actual DC component of the signal prior to the second secondary combination, which DC component was −2, the DC component of the entire signal portion is zero.

The reason that the first bit of the secondary combinations is chosen to be zero, as was pointed out above in connection with Table II, will now be clear. If secondary combinations were chosen with an initial bit of digital 1, then to change the actual DC component of that combination from −2 to +2, or vice versa, would require changing the first bit from a digital one to a digital zero. That change could result in having enough consecutive zeroes to make $T_{max}/T_{min}$ greater than four.

In any case, FIG. 3B illustrates another example. If the number of level transitions before the start of the second secondary combination is odd, then that secondary combination begins at a high level and its DC component will be +2. Thus, no inversion is required to make the DC component of the entire three-word signal portion shown $CW_1$–$CW_3$ in FIG. 3B zero.

FIG. 4 shows an example of an apparatus which is capable of conversion in accordance with the above system. In FIG. 4, reference numeral 1 designates an input terminal, 2 an 8-bit shift register which accepts information of 8 bits, 3 a conversion logic circuit and 4 a 10-bit shift register. Then, information applied to the input terminal 1 is transferred 8 bits by 8 bits through the shift register 2 and the information of 8 bits ($B_1$, $B_2$, $B_3$, $B_4$, $B_5$, $B_6$, $B_7$, $B_8$) is supplied to the logic circuit 3. In the logic circuit 3, the above one-to-one conversion is carried out and then information of converted 10 bits ($P_1$, $P_2$, $P_3$, $P_4$, $P_5$, $P_6$, $P_7$, $P_8$, $P_9$, $P_{10}$) is supplied to the shift register 4.

Further, the number of level transitions of the signal after being NRZI-coded is detected by the logic circuit 3. Since the number of level transitions is known in advance for each combination, a read-only memory, for example, which constructs the logic circuit 3 can simultaneously produce information regarding the number of level transitions (information is made enough to present only whether the number of level transitions is odd or even, and when it is odd, the information is digital "1".). This output Q is supplied to a latch circuit 8 and the latched output Q' from the latch circuit 8 is supplied to the logic circuit 3. A timing signal regarding information of every 8 bits supplied to the input terminal 1 is detected by a detecting circuit 9, and this timing signal is supplied to the load terminal of the shift register 4 and the latch terminal of latch circuit 8.

When the bits are converted to, for example, the above secondary combination, the latched output Q' is used in such a manner that when the latched output Q' is "0", the initial bit is converted to "1", while when the latched output Q' is "1", the initial bit is converted to "0". At that time, as the output Q is produced the information indicating whether the number of level transitions is odd or even which then is latched to the latch circuit 8. Further, when the bits are converted to the primary combination, the output of 10 bits is delivered as it is, and as the output Q is produced an odd or even information which is a sum between the number of level transitions of the primary combination and the latched output Q', which is then latched.

Further, a clock signal with frequency 5/4 times the clock of the input signal is supplied through a clock terminal 5 to the shift register 4 from which the above ten bits are read out in turn. This read-out signal is supplied to a JK flip-flop circuit 6 and the clock signal from the clock terminal 5 is supplied to the JK flip-flop circuit 6 so that a signal which is NRZI-coded is produced at an output terminal 7.

FIG. 5 shows an example of an apparatus for demodulating information which was modulated.

In FIG. 5, reference numeral 11 designates an input terminal through which a signal is supplied through an NRZI demodulating circuit 12 to a 10-bit shift register 13. Information of ten bits, $P_1$ to $P_{10}$ from the shift register 13 is supplied to a conversion logic circuit 14 in which the information of ten bits, $P_1$ to $P_{10}$ is demodulated using one-to-one reverse conversion. Accordingly, the demodulated information of eight bits, $B_1$ to $B_8$ is delivered to an 8-bit shift register 15 and then developed at an output terminal 16. In this case, when the above ten-bit information of the secondary combination is supplied to the logic circuit 14, the reverse conversion is carried out regardless of the initial bit.

As described above, the conversion and demodulation of data can be carried out.

In this system, however, when the logic circuits 3 and 14 are made of the read-only memory, a very large number of bits must be provided so that when the logic circuits 3 and 14 are formed as a large scale integrated circuit, a large area is required thereby, which then is not preferable.

OBJECTS AND SUMMARY OF THE INVENTION

It is an object of the present invention to provide an improved digital data converting method and apparatus thereof.

It is another object of the present invention to provide a digital data converting method and apparatus thereof in which a logic circuit can be simplified in construction.

It is a further object of the present invention to provide a digital data converting method and apparatus thereof suitable for a case in which an audio signal or the like is pulse code-modulated (PCM) and then recorded.

It is a still further object of the present invention to provide an NRZI-coded signal having a DC component substantially equal to zero with a minimum of low frequency components.

It is a yet further object of the present invention to provide a method and apparatus for converting a base digital signal into an NRZI-coded converted digital signal with a DC component substantially equal to zero and a predetermined maximum time between level changes.

According to one aspect of the present invention, there is provided a method for converting a digital data into a NRZI-coded digital signal, the method comprising the steps of:

first detecting if the value of every even numbered bit of said digital data is digital zero;

second detecting if two bits of said detected even numbered bits having digital zero value and a preceding odd numbered bit have a DC component;

producing a detecting signal according to the result of said second detecting; and converting said digital data into said NRZI-coded digital signal by using said detecting signal.

According to another aspect of the present invention, there is provided an apparatus for converting a digital data into an NRZI-coded digital signal, the apparatus comprising:

first means for detecting if the value of every even numbered bit of said digital data is digital zero; second means for detecting if two bits of said detected even numbered bits having digital zero value and a preceding odd numbered bit have a DC component;

means for producing a detecting signal according to the result of said second detecting; and means for converting said digital data into said NRZI-coded digital signal by using said detecting signal.

According to a further aspect of the present invention, there is provided a method for converting a base digital signal divided into a series of base words each with m bits of data into a converted digital signal by matching a converted word with each said base word, each said converted word having n bits of data, which satisfies a predetermined condition, wherein n is greater than m, the method comprising the steps of:

further dividing said converted word into a plurality of sets;

providing classifications each including said sets of same pattern;

dividing said base word into a plurality of sets corresponding to said plurality of sets of said converted word;

converting each of said plurality of sets of said base word into each of said plurality of sets of said converted word having suitable pattern in said classifications;

detecting if connection of consecutive plurality of sets of said converted word each having suitable pattern satisfies said predetermined condition;

producing a detecting signal if not satisfied; and changing the pattern of said set of said converted word satisfying said condition according to said detecting signal.

According to a still further aspect of the present invention, there is provided an apparatus for converting a base digital signal divided into a series of base words each with m bits of data into a converted digital signal by matching a converted word with each said base word, each said converted word having n bits of data, which satisfies predetermined condition, wherein n is greater than m, the apparatus comprising:

means for dividing said converted word into a plurality of sets;

means for dividing said base word into a plurality of sets corresponding to said plurality of sets of said converted word;

means for converting each of said plurality of sets of said base word into each of said plurality of sets of said converted word having suitable pattern in classifications each including said sets of same pattern;

means for detecting if connection of consecutive plurality of sets of said converted word each having suitable pattern satisfies said predetermined condition and for producing a detecting signal if not satisfied; and means for changing the pattern of said set of said converted word satisfying said condition according to said detecting signal.

According to a yet further aspect of the present invention, there is provided an apparatus for modulating and demodulating a base digital signal divided into a series of base words each with m bits of data into a converted digital signal by matching a converted word with each said base word, and vice versa, the apparatus comprising:

a logic circuit provided with said base digital signal and a converted digital signal;

said logic circuit having a control terminal and a first logic means being selected when said control terminal is supplied with a first signal value, a second logic means being selected when said control terminal is supplied with a second signal value, and a third logic means employed for both of modulating and demodulating.

The other objects, features and advantages of the present invention will become apparent from the following description taken in conjunction with the accompanying drawings through which the like references designate the same elements and parts.

BRIEF DESCRIPTION OF THE DRAWINGS

FIGS. 1A to 1C illustrate possible ten-bit secondary combinations of a converted digital signal NRZI-coded;

FIG. 2A illustrates a ten-bit secondary combination of a converted digital signal NRZI-coded;

FIG. 2B illustrates the ten-bit combination shown in FIG. 2A with the first bit thereof inverted from a digital zero to a digital one;

FIGS. 3A and 3B illustrate converted digital signals;

FIGS. 12 to 17 are respectively diagrams showing different 278 ten-bit patterns.

DESCRIPTION OF THE PREFERRED EMBODIMENT

Figure 4:
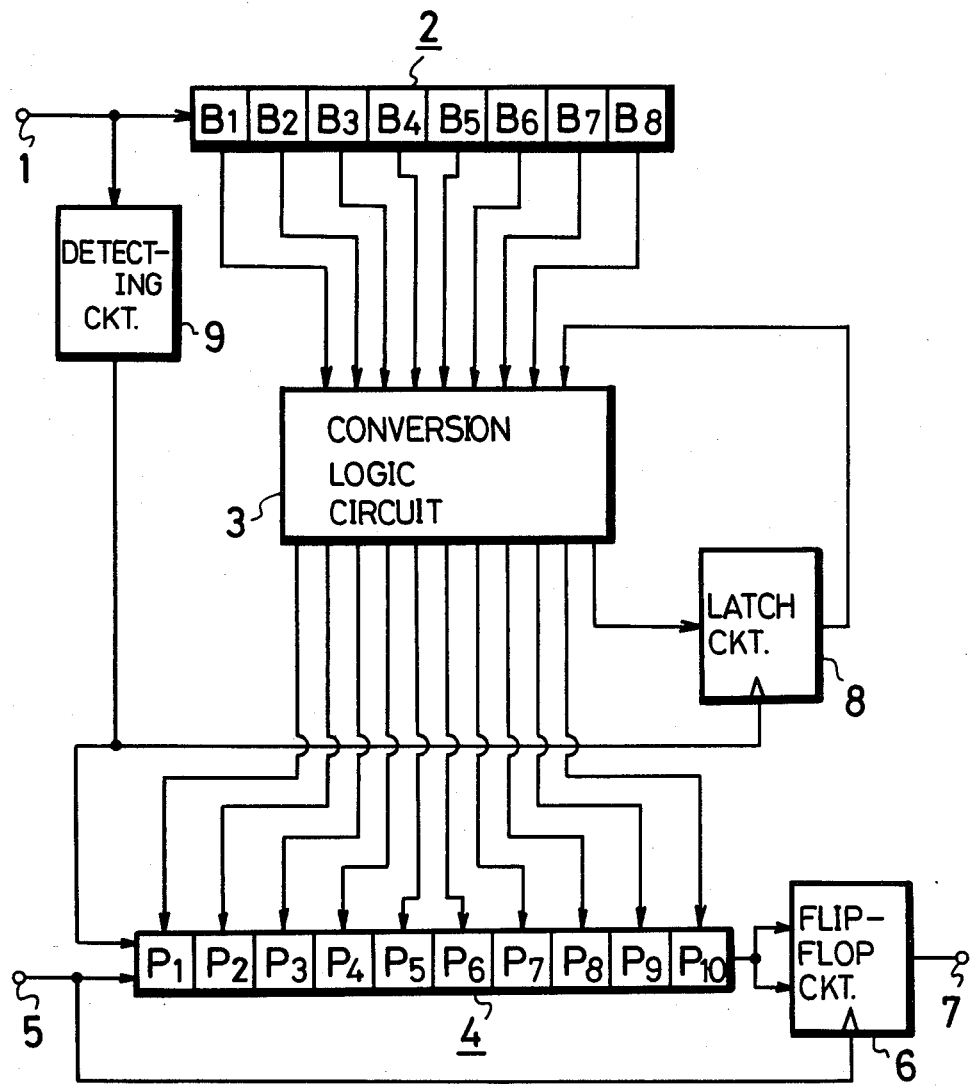
FIG. 4 schematically illustrates apparatus for generating an m-bit NRZI-coded converted digital signal from an n-bit base digital signal.
Figure 5:
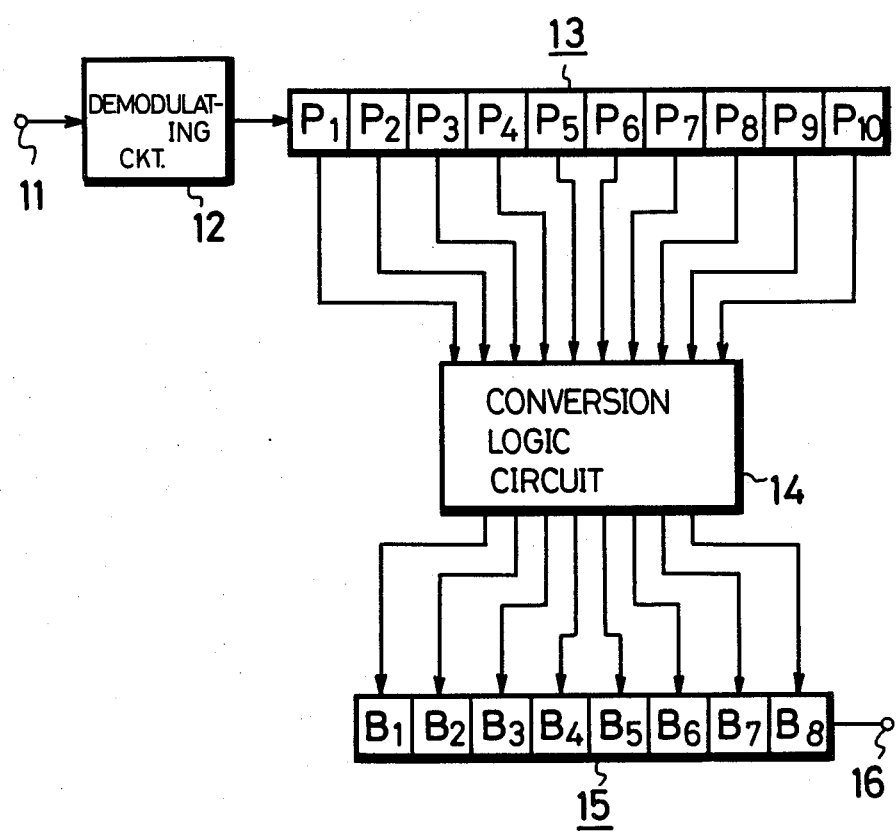
FIG. 5 schematically illustrates apparatus for restoring an n-bit base digital signal from the m-bit NRZI-coded converted digital signal.

Now, the present invention will hereinafter be described in detail with reference to the drawings.

Of 1,024 different combinations of ten bits, ten-bit pattern which can satisfy the above constraints are made in 278 different ways (the 278 ten-bit patterns are shown in FIGS. 12 to 17). In 278 patterns of ten-bit combinations, if the patterns are divided into upper 5 bits and lower 5 bits and then classified, the pattern of the lower 5 bits can be classified into five groups, A to E as shown on the following TABLE III. In addition, there are exception patterns.

TABLE III

| A | B | C | D | E |
|---|---|---|---|---|
| 10101 | 00101 | | | |
| 10111 | 00111 | | | |
| 01001 | 11001 | 10001 | | |
| 11010 | 01010 | | | 10010 |
| 01011 | 11011 | 10011 | 00011 | |
| 11101 | 01101 | | | |
| 01110 | 11110 | 10110 | 00110 | |
| 11111 | 01111 | | | |

Table III shows that in the groups A and B, the initial bit is inverted but the remaining four bits are equal to one another. Further, the lower three bits of the groups C and D are equal to the lower three-bit of the patterns which begin with "0" in the group A and with "1" in the group B.

While, the upper 5 bits are combined in 21 different ways as shown on the following Table IV.

TABLE IV

| | Upper 5 bits | Groups of lower 5 bits | The number of patterns |
|---|---|---|---|
| 1 | 01001 | Ⓑ D | 8 |
| 2 | 01011 | Ⓐ C E | 8 |
| 3 | 01101 | Ⓐ Ⓑ E | 16 |
| 4 | 01010 | Ⓐ Ⓑ E | 16 |
| 5 | 01100 | Ⓐ E | 8 |
| 6 | 01110 | Ⓐ C E | 8 |
| 7 | 00100 | Ⓐ' Ⓒ E | 8 |
| 8 | 00101 | Ⓐ Ⓑ E | 16 |
| 9 | 00110 | Ⓐ E | 8 |
| 10 | 00111 | Ⓐ Ⓑ E | 16 |
| 11 | 01111 | Ⓐ Ⓑ E | 16 |
| 12 | 11001 | Ⓐ Ⓑ | 16 |
| 13 | 11010 | Ⓐ Ⓒ E | 11 |
| 14 | 11011 | Ⓐ Ⓑ E | 16 |
| 15 | 10100 | Ⓐ Ⓑ E | 14 |
| 16 | 10101 | Ⓐ C E | 8 |
| 17 | 11101 | Ⓑ D | 8 |
| 18 | 11110 | Ⓐ Ⓑ E | 16 |
| 19 | 11111 | Ⓐ C E | 8 |
| 20 | 10111 | Ⓑ Ⓓ | 10 |
| 21 | 11000 | Ⓐ' | 5 |

For these patterns, groups A to E of lower 5 bits which satisfy the above constraints and are connectable become as shown in the central column of Table IV. In Table IV, reference letter A' denotes lower five bits which begin with level except "0", while reference letter B' denotes lower five bits which begin with levels except "00".

Therefore, when the groups marked by circles on Table IV are employed, the number of the patterns formed by respective connections of the bits becomes as shown in the right-hand side column on Table IV and 240 patterns can be formed. Further, by adding 16 patterns in which the lower five bits belong to the group E thereto, it is possible to form 256 patterns.

The, input pattern of 8 bits is divided into upper and lower 4 bits each. The pattern of each 4 bits is combined in different 16 ways. Therefore, the patterns of upper 4 bits are respectively made corresponding to one or more of 21 patterns on the Table IV, while the patterns of lower 4 bits are respectively made corresponding to the patterns of the group 5 on the Table II.

That is, 16 patterns of lower 4 bits are made corresponding to 16 patterns of the groups A and B on the Table III. As a result, the upper 4 bits of the input can directly be made corresponding to 9 patterns of upper 5 bits which adopt the groups A, B (including B') in the central column of the Table IV. Then, of 9 patterns of upper 5 bits which adopt any one of the groups A (including A') and B, 2 patterns which adopt the group B and desired 2 patterns which adopt the group A are combined with one another and two pairs of the upper 5 bits (each 2 patterns) are made corresponding to 2 patterns of the upper 4 bits of the input. Also, of the remaining 5 patterns which adopt the group A, desired 2 patterns are combined to each other so that one pair of the upper 5 bits (2 patterns) are made corresponding to 1 pattern of the upper 4 bits of the input. Further, 2 patterns of upper 5 bits which adopt the groups A (including A′) and C are combined with desired 2 patterns in the remaining 3 patterns which adopt the group A so that two pairs of the upper 5 bits (each 2 patterns) are made corresponding to 2 patterns of the upper 4 bits of the input. Further, the remaining 1 pattern which adopts the group A is combined with 1 pattern which adopts the groups B and D so that one pair of the upper 5 bits (two patterns) are made corresponding to 1 pattern of the upper 4 bits of the input. Then, 16 patterns of upper 5 bits which adopt the group E are made corresponding to 1 pattern of upper 4 bits of the input.

With the combinations thus made, 8/10 conversion can be divided into 2 systems of 4/5 conversion. As a result, the conversion logic can extremely be simplified.

Figure 6:
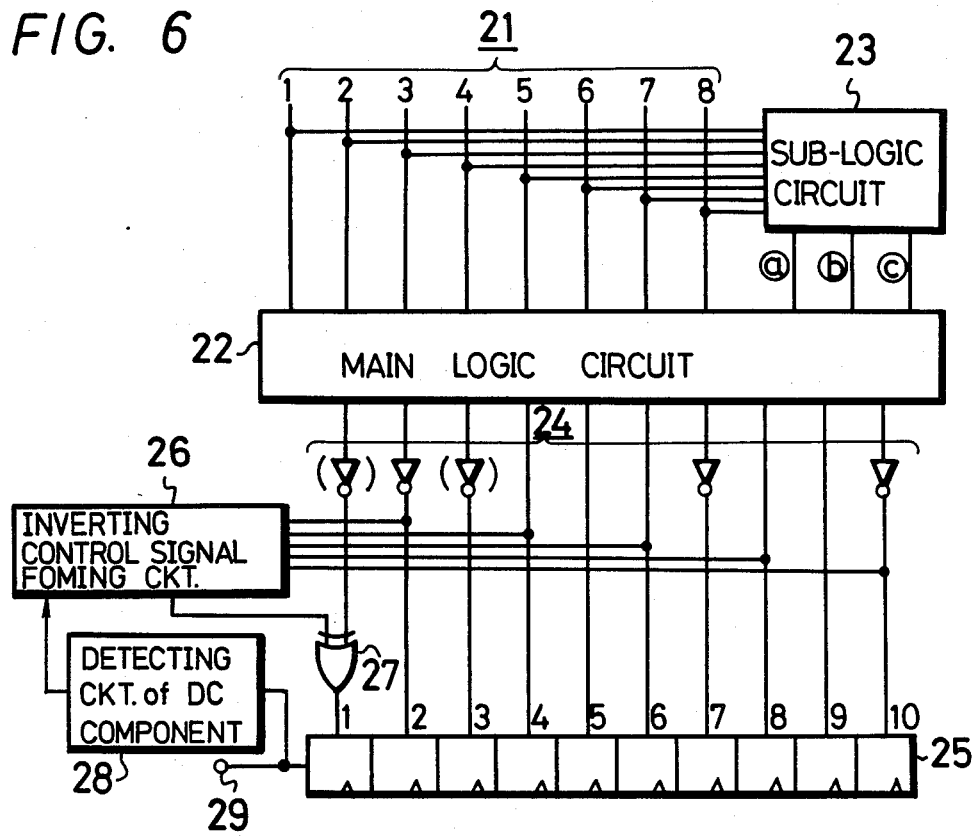
FIG. 6 is a block diagram showing an embodiment of an information converting apparatus according to the present invention.

An example of a converting circuit and a demodulating circuit of the invention will be described hereinafter. FIG. 6 shows an example of a converting circuit used in the present invention.

In FIG. 6, reference numeral 21 designates an eight-bit input terminal group, 22 main logic circuit for conversion which is made of a programmable logic array (PLA) or a gate, and 23 a sub-logic circuit capable of reducing the load of the main logic circuit 22.

The sub-logic circuit 23 produces detecting signals by detecting the input pattern. That is, in the above embodiment, from the sub-logic circuit 23 produced are, for example, a detecting signal a which is made on when input corresponding to a pattern of the pair which does not include the group B appears, while is made off in other cases; a detecting signal b which is made on when input corresponding to a pattern of the pair which includes the group E appears, while is made off in other cases; and a detecting signal c which is made on when input corresponding to the pair including the groups A′, B′ appears, while is made off in other cases.

Figure 7:
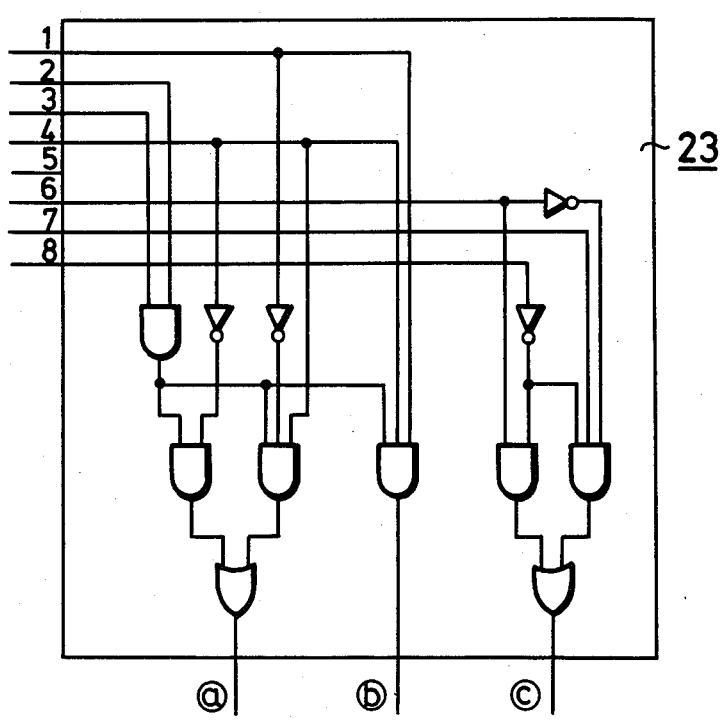
FIG. 7 is a block diagram showing a practical example of a sub-logic circuit used in the converting apparatus of the invention shown in FIG. 6.

FIG. 7 shows a practical example of a circuit for such a case in which the pair having, for example, two of the group A are assigned to $6_H$, $7_H$ and $E_H$ of upper 4 bits of the input and the pair including the group E are assigned to $F_H$ of upper 4 bits of the input. It is sufficient that the detecting signal c, when sequentially assigned with 000 to 111 of lower 3 bits of the input on Table III, is made on with 010, 100 and 110 and made off in other case. In this case, the circuit thereof becomes as shown in FIG. 7.

Then, these detecting signals a to c are respectively supplied to the main logic circuit 22 as shown in FIG. 6 to control the latter, whereby the conversion logic can extremely be simplified.

Reference numeral 24 designates a group of inventers which are provided at the outputs of the PLA so as to alleviate the main logic circuit 22. The non-parenthesized inverters are more effective, while the parenthesized inverters, if they are provided, are more advantageous.

Reference numeral 25 designates a shift register for the output.

Further, reference numeral 26 designates a circuit which forms an inverting control signal of an output intial bit by detecting the above DC component. Reference numeral 27 designates an exclusive-OR circuit which inverts the initial bit by using the control signal and reference numeral 28 designates a detecting circuit of DC component.

The inverting control signal forming circuit 26 is formed as follows.

Figure 8:
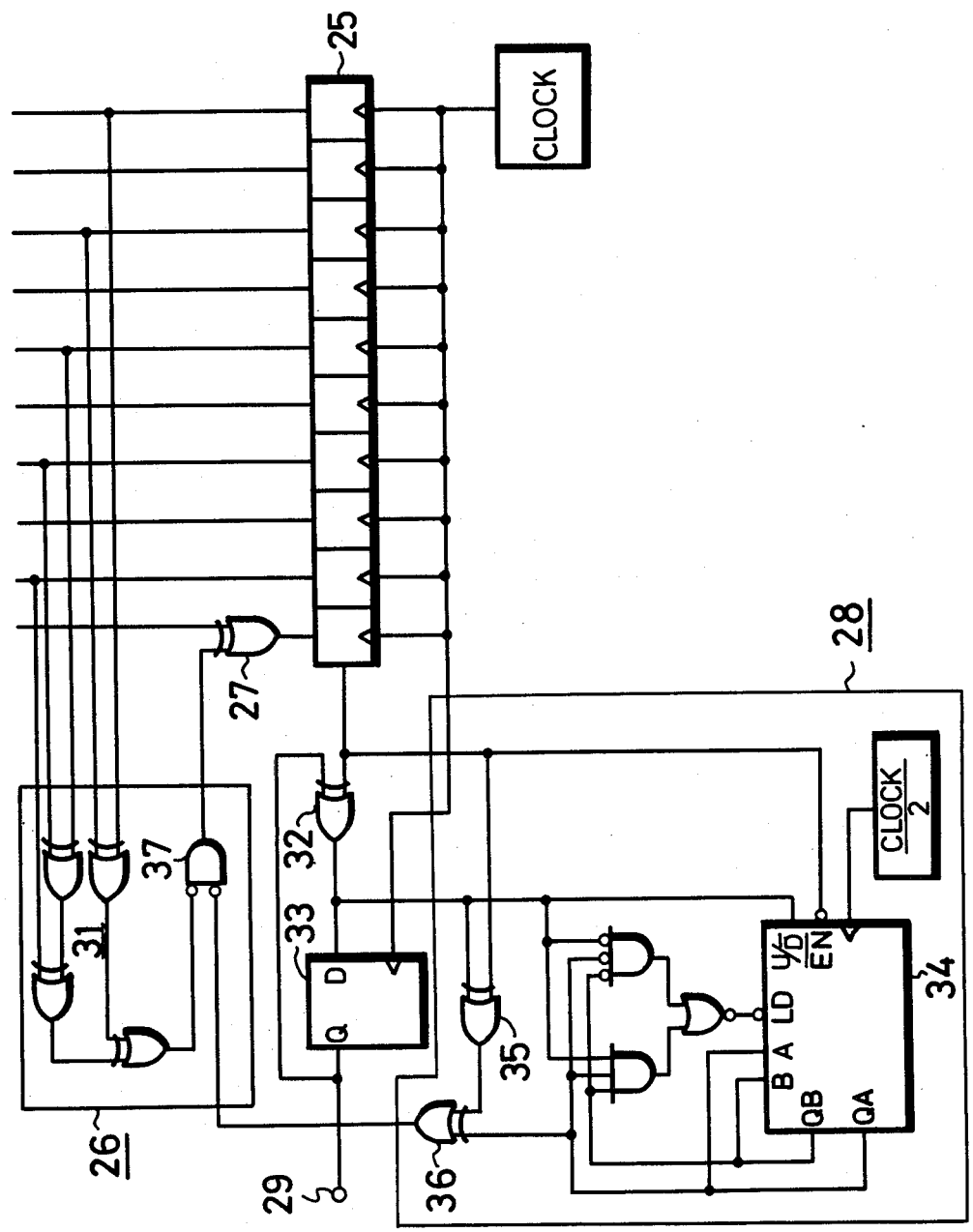
FIG. 8 is a block diagram showing a practical example of parts of the apparatus shown in FIG. 6.

As shown in FIG. 8, the outputs at the even numbered bits are respectively supplied to an exclusive-OR circuit 31 and calculated in exclusive-OR logical operation for all the outputs. In this case, when the even bit is "1", this bit is inverted here so that the DC components of this bit and the immediately preceding bit become zero. While, when the even bit is "0", the DC component of ±2 exists. Further, when the bit begins with two zeros, the DC component becomes 0 or ±4. Similarly, when the bit begins with three zeroes, the DC component becomes ±2 or ±6. That is, when the number of zeroes is even, the DC component becomes 0, ±4, ±8 ..., while it is odd, the DC component becomes ±2, ±6, ±10.... On the other hand, the DC component of 10 bits on the whole is limited to 0 or −2. As a result, by detecting whether the number of 0 in the above even bit is even or odd, it is possible to judge whether the DC component is 0 or ±2.

Therefore, the above exclusive-OR circuit 31 can detect that when the output is "1", the DC component is 0, while when the output is "0", the DC component is −2.

Further in FIG. 8, an exclusive-OR circuit 32 and a D flip-flop 33 constitute an NRZI coding circuit.

The DC component detecting circuit 28 (in FIG. 6) is formed of an up-down counter 34. That is, the up-down counter 34 is driven by a clock with ½ frequency so as to count only even numbered bits. The up-down of the counter 34 is controlled by the output from the exclusive-OR circuit 32 whereby to detect the DC component. Since the output of the up-down counter 34 is always delayed by 2 bits, exclusive-OR circuits 35, 36 are provided to compensate for the value by the final 2 bits.

Thus, the positive or negative polarity of the DC component is detected. This detected signal and the signal from the exclusive-OR circuit 31 are respectively supplied to a NAND circuit 37 which then forms the inverting control signal of the initial bit.

Another version of inverting the initial bit is provided such that the DC component is detected by the counter or the like to directly invert the initial bit of the output from the shift register 25.

As described above, the coding signal is delivered to an output terminal 29.

Figure 9:
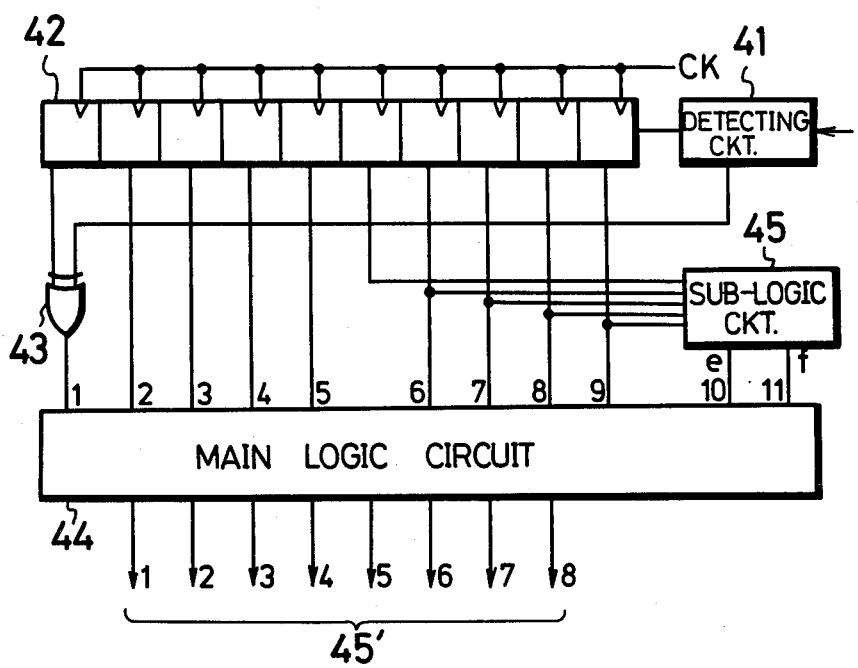
FIG. 9 is a block diagram showing an example of a demodulating apparatus used in the present invention.

Further, FIG. 9 shows an example of a demodulating circuit. In FIG. 9, reference numeral 41 designates a DC component detecting circuit which is formed of a counter or the like. An input signal is supplied through this detecting circuit 41 to a shift register 42, and the initial bit is inverted by an exclusive-OR circuit 43 in response to the signal from the circuit 41 and then supplied to a main logic circuit 44.

Figure 10:
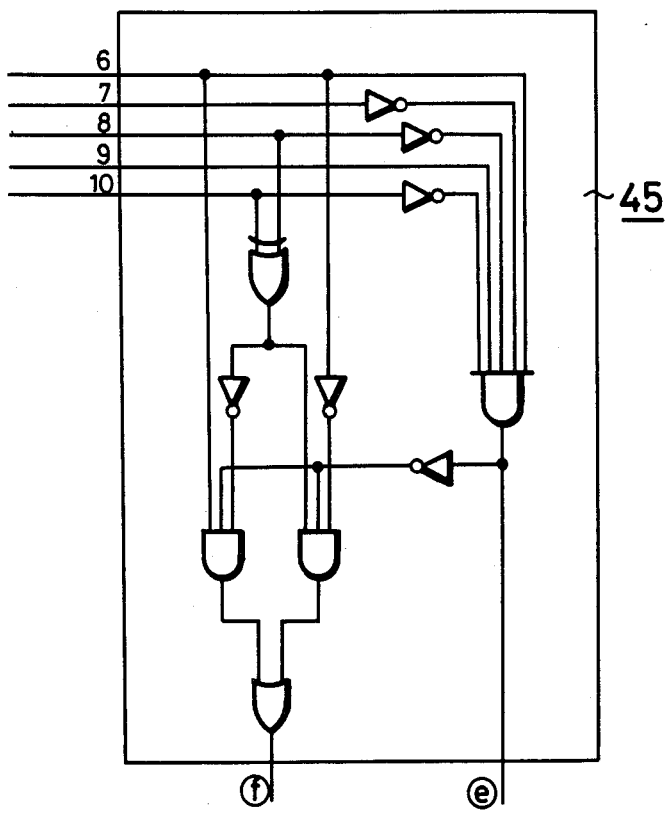
FIG. 10 is a block diagram of a practical example of a sub-logic circuit used in the demodulating apparatus shown in FIG. 9.

Reference numeral 45 designates a sub-logic circuit which is constructed as shown in, for example, FIG. 10 to provide a detecting signal e for the pattern including the group E and a detecting signal f for the pattern including the group A. Upon detecting the groups A and B, the group A is detected when the third and fifth bits are equal to each other and their initial bits are "1" and when the third and fifth bits are different from each other and their initial bits are "0". While, the group B is detected when the third and fifth bits are equal to each other and their initial bits are "0" and when the third and fifth bits are different from each other and their initial bits are "1".

Then, these detecting signals e and f are supplied to the main logic circuit 44 to control the conversion logic, whereby the conversion logic can extremely be simplified.

If the detecting signal f is used, the sixth bit of the input becomes unnecessary. By this way, the demodulated output is delivered to the output terminal group 45'.

Figure 11:
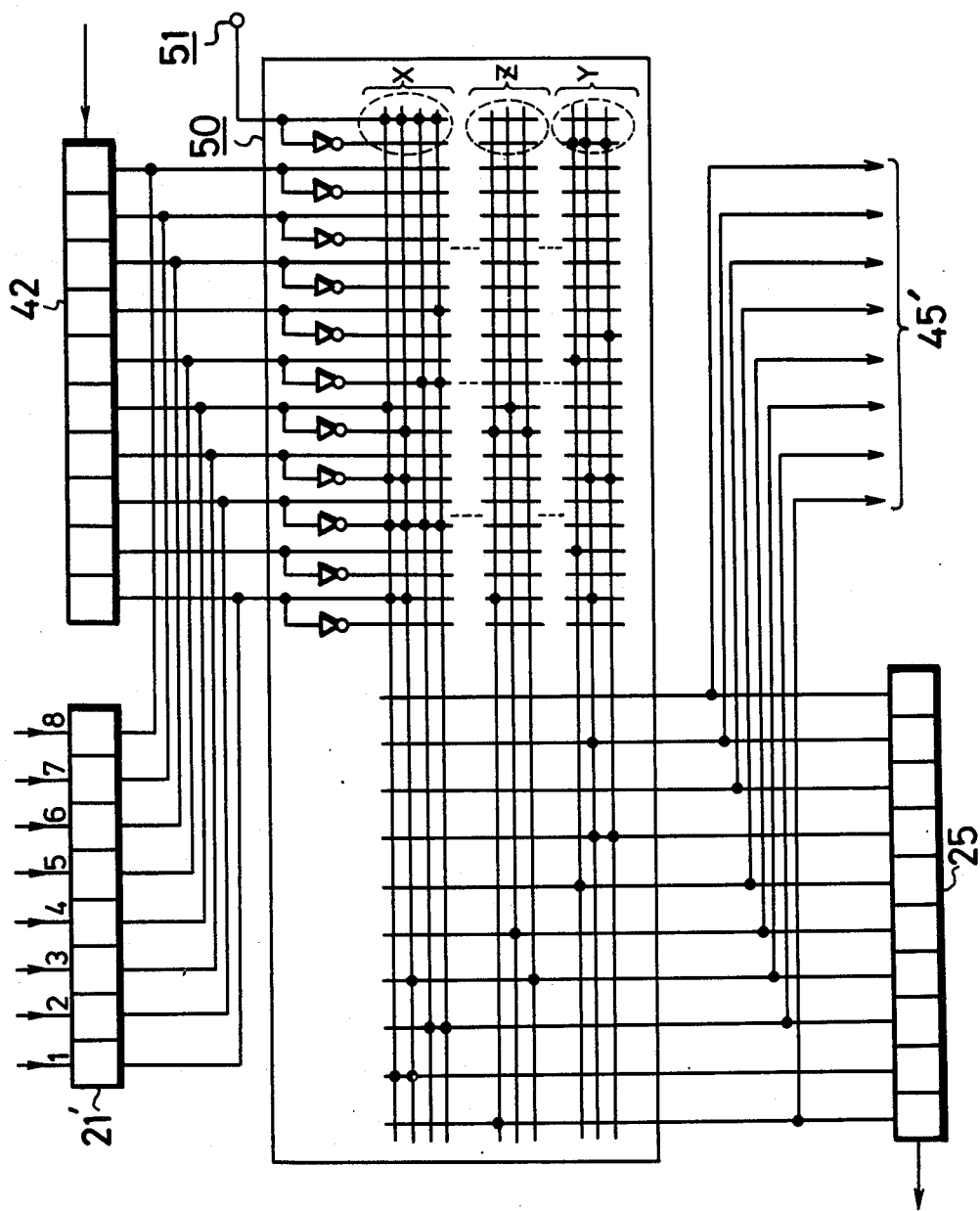
FIG. 11 is a block diagram showing an example of a circuit in which main logic circuits used in the converting and demodulating apparatus shown in FIGS. 6 and 9 are formed integral with each other.

Further, FIG. 11 shows an example in which the main logic circuit 22 and 44 in the conversion and demodulating circuits are integrated into a circuit 50. As shown in FIG. 11, outputs from an input circuit 21' corresponding to the input terminal group 21 in FIG. 6 and the outputs from the shift register 42 in FIG. 9 are converted commonly as a tri-state output and connected to the main logic circuit 50. On the other hand, the switching signal for conversion and demodulation is applied through a terminal 51 to the main logic circuit 50.

Considering the logics of the main logic circuits 22 and 44, there exist many logics common to the main logic circuits 22 and 44.

Therefore, when logic X which is selected when the signal from the terminal 51 is "0", logic Y which is selected when the signal from the terminal 51 is "1" and common logic Z which is selected at all times are provided, the arrangement of the conversion logic can be simplified more than the case in which the main logic circuits 22 and 44 are formed separetely.

When the conversion and the demodulation are carried out simultaneously, they can be carried out in a time sharing manner.

According to the present invention, the conversion logic can be simplified.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A method for converting digital data into an NRZI-coded digital signal, the method comprising steps of:
    first detecting if the value of every even numbered bit of said digital data is digital zero;
    second detecting if two bits of said detected even numbered bits having digital zero value and a preceding odd numbered bit have a DC component;
    producing a detecting signal according to the result of said second detecting; and
    converting said digital data into said NRZI-coded digital signal by using said detecting signal, thereby tending to minimize said DC component.

2. A method according to claim 1, further including steps of dividing said digital signal into a series of words each with n bits, wherein said first and second detecting steps comprise the step of detecting the number of said even numbered bits included in each one of said series of words which have digital zero value.

3. An apparatus for converting digital data into an NRZI-coded digital signal, the apparatus comprising:
    first means for detecting if the value of every even numbered bit said digitial data is digital zero;
    second means for detecting if two bits of said detected even numbered bits having digital zero value and a preceding odd numbered bit have a DC component;
    means for producing a detecting signal according to the result of said second detecting; and
    means converting said digital data into said NRZI-coded digital signal by using said detecting signal, thereby tending to minimize said DC component.

4. Apparatus according to claim 3, further including means for dividing said digital signal into a series of words each with n bits, wherein said first and second detecting means comprise means for detecting the number of said even numbered bits included in each one of said series of words which have digital zero value.

5. In a method for converting a base digital signal divided into a series of base words each with m bits of data into a converted digital signal by matching a converted word with each said base word, each said converted word having n bits of data, which satisfies a predetermined condition, wherein n is greater than m, the improvement comprising the steps of:
    further dividing said converted word into a plurality of sets;
    providing classifications of said sets according to their respective patterns;
    dividing said base word into a plurality of sets corresponding to said plurality of sets of said converted word;
    converting each of said plurality of sets of said base word into each of said plurality of sets of said converted word having a suitable pattern in said claasifications;
    determining whether connection of a consecutive plurality of sets of said converted word each having a suitable pattern satisfies said predetermined condition;
    producing a detecting signal if said predetermined condition is not satisfied; and
    changing the pattern of said set of said converted word satisfying said condition according to said detecting signal in such a manner as to tend to minimize the DC component of a series of said converted words.

6. In apparatus for converting a base digital signal divided into a series of base words each with m bits of data into a converted digital signal by matching a converted word with each said base word, each said converted word having n bits of data, which satisfies a predetermined condition, wherein n is greater than m, improvement comprising:
    means for dividing said converted word into a plurality of sets;
    means for dividing said base word into a plurality of sets corresponding to said plurality of sets of said converted word;
    means for converting each of said plurality of sets of said base word into each of said plurality of sets of said converted word having a suitable pattern in classifications each including said sets of the same pattern;
    means for determining whether if connection of consecutive plurality of sets of said converted word each having a suitable pattern satisfies said predetermined condition and for producing a detecting signal if said predetermined condition is not satisfied; and
    means for changing the pattern of said set of said converted word satisfying said condition according to said detecting signal in such a manner as to tend to minimize the DC component of a series of said converted words.

7. In apparatus for modulating and demodulating a base digital signal divided into a series of base words each with m bits of data into a converted digital signal by matching a converted word with each said base word, and vice versa, the improvement comprising:
 a logic circuit provided with said base digital signal and a converted digital signal;
 said logic circuit having a control terminal, a first logic means, a second logic means, and a third logic means and said first logic means being selected when said control terminal is supplied with a first signal value, said second logic means being selected when said control terminal is supplied with a second signal value, and said third logic means being employed for both modulating and demodulating.

8. Apparatus according to claim 7, wherein said logic circuit includes a programmable logic array.

* * * * *